United States Patent
Stroh

(10) Patent No.: US 6,257,795 B1
(45) Date of Patent: Jul. 10, 2001

(54) CONNECTION BETWEEN A TIE ROD LINKAGE AND A STEERING KNUCKLE ARM

(76) Inventor: Clinton Byron Stroh, 810 E. Spring St., Yorkville, IL (US) 60560

( * ) Notice: Subject to any disclaimer, the term of this patent is extended or adjusted under 35 U.S.C. 154(b) by 0 days.

(21) Appl. No.: 09/343,250

(22) Filed: Jun. 30, 1999

(51) Int. Cl.⁷ .................................................. F16C 33/74
(52) U.S. Cl. .................... 403/131; 403/135; 280/93.511
(58) Field of Search ................... 403/131, 128, 403/134, 135, 141, 143; 280/93.511

(56) References Cited

U.S. PATENT DOCUMENTS

| | | |
|---|---|---|
| 1,910,926 | 5/1933 | Lutz . |
| 2,305,880 | 12/1942 | Leighton . |
| 2,807,486 | 9/1957 | Bixby . |
| 3,103,377 | 9/1963 | Scheublein et al. . |
| 3,202,444 | 8/1965 | Rowlett . |
| 3,240,509 * | 3/1966 | Pierce ................................ 403/131 X |
| 3,479,051 | 11/1969 | Weiss . |
| 3,549,167 | 12/1970 | Guenther et al. . |
| 3,723,995 * | 4/1973 | Baumann ........................ 403/131 X |
| 4,069,864 * | 1/1978 | Novoryta et al. ................. 403/131 X |
| 4,331,367 | 5/1982 | Trudeau et al. . |
| 4,666,329 * | 5/1987 | Hugelmann ...................... 403/131 X |
| 4,718,779 | 1/1988 | Trudeau . |
| 5,066,159 | 11/1991 | Urbach . |
| 5,503,418 | 4/1996 | Schmidt . |

FOREIGN PATENT DOCUMENTS

| | | |
|---|---|---|
| 269 836 A2 | 6/1988 | (EP) . |
| 1 456 228 | 11/1976 | (GB) . |
| 2 090 633 | 7/1982 | (GB) . |

* cited by examiner

Primary Examiner—Lynne H. Browne
Assistant Examiner—John R. Cottingham
(74) Attorney, Agent, or Firm—Liniak, Berenato, Longacre & White

(57) ABSTRACT

A connection between a steering knuckle arm and tie rod linkage. A spherical bearing having an integral seal formed thereon is disposed within a machined bore formed in one of the steering knuckle arm or tie rod linkage. A mounting stud is pressed into the spherical bearing and extends to the other of the steering knuckle or tie rod end of which the spherical bearing is disposed and extends there through to threadingly engage a nut to secure the mounting stud and firmly connect the steering knuckle arm to the tie rod linkage. The integral seals eliminate the need for separate boot seals thus forming a closer and more precise connection between the steering knuckle arm and tie rod linkage.

13 Claims, 2 Drawing Sheets

CONNECTION BETWEEN A TIE ROD LINKAGE AND A STEERING KNUCKLE ARM

FIELD OF THE INVENTION

The present invention relates to an improved connection between a steering knuckle arm and a tie rod linkage and more particularly to a connection incorporating a spherical bearing with an integral seal, disposed within a machined recess of either the tie rod linkage or steering knuckle arm.

DESCRIPTION OF THE PRIOR ART

Prior art connections require a tapered bore to be machined in either the steering knuckle arm or tie rod linkage which is difficult and costly to manufacture with precision. If the taper is cut too deep or too shallow, then the mounting stud will not seat properly. If the taper angle is not held correctly there is a potential for the tie rod end/ball stud breakage. Joint looseness will lead to premature tire wear. Moreover, bearing connections employing a boot seal around a spherical ball stud pose additional drawbacks. These prior art connections and boot seals are expensive, difficult to assembly and to do not adequately protect the bearing connection. Seal damage and resulting wear of the ball joint due to contamination increase the cost of warranty for steering axles.

SUMARRY OF THE INVENTION

The present invention is directed to a connection between a tie rod linkage and a steering knuckle arm. The steering knuckle arm (or tie rod linkage) is machined with a cylindrical bore to receive a spherical bearing. The spherical bearing has its own integral seals. A mounting stud is pressed into the spherical bearing and connected to the tie rod linkage (or steering knuckle arm). The high warranty boot seal of the prior art is thus eliminated. The tie rod linkage and steering knuckle arm may then be installed much closer thus providing improved wheel clearance when the axle is steered in full range. Axle assembly deflection under load characteristics is also improved.

DETAILED DESCRIPTION OF THE PREFERRED EMBODIMENT

Figure 1:
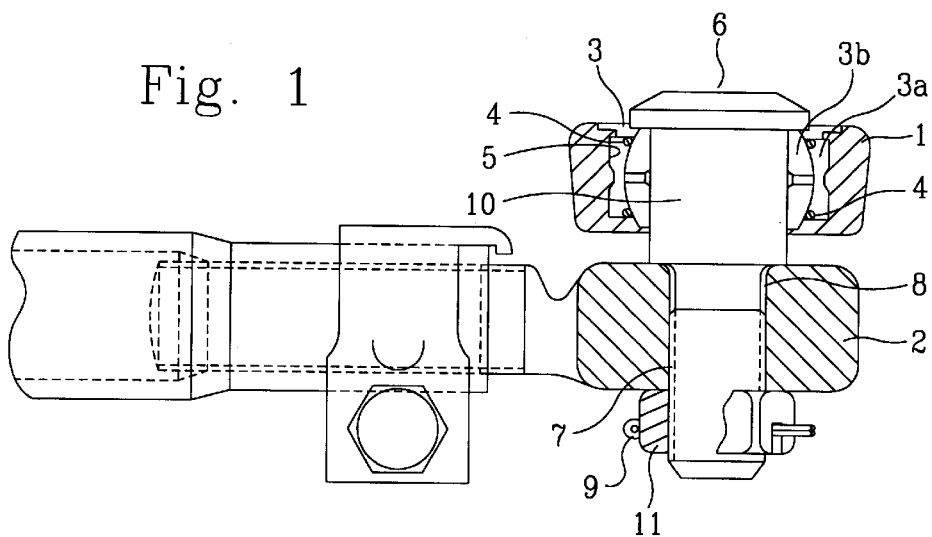
FIG. 1 is a partial cross sectional side view of a connecting joint between a tie rod linkage and steering knuckle arm with a spherical bearing and integral seal mounted within the steering knuckle arm.

FIG. 1 depicts a connection between a steering knuckle arm 1 and a tie rod linkage 2. A spherical bearing 3, having an outer race 3a and an inner race 3b disposed within and engaging the outer race 3a, and seals 4 integral with the outer race 3a. The bearing 3 is disposed within a cylindrical bore 5 in the steering knuckle arm 1. Bore 5 is specifically machined to receive and retain the spherical bearing 3. A mounting stud 6 is press fit into the spherical bearing 3. The mounting stud 6 has a flanged end to prevent the mounting stud 6 from passing through the spherical bearing 3. The mounting stud 6 extends through the spherical bearing 3 to an opposite end for attachment to tie rod linkage 2.

A threaded end 7 of the mounting stud 6 extends through a bore 8 in the tie rod linkage 2. A nut 11 is secured to the threaded end 7 of the mounting stud 6 to secure the connection. A cotter pin 9 may also be employed to positively lock the connection.

The integral seals 4 eliminate the need for a protective boot and allow the tie rod linkage 2 and steering knuckle arm 1 to be secured together within closer tolerances.

FIGS. 1–4 all depict the same connection between the mounting stud 6, spherical bearing 3 with integral seals 4 and steering knuckle arm 1. Each of FIGS. 1–4 contains alternate embodiments for the connection between the mounting stud and the tie rod linkage 2. In the embodiment of FIG. 1, the mounting stud 6 has a cylindrical shank portion 10 extending through the spherical bearing 3 and up against the tie rod linkage 8. The width of the cylindrical shank portion 10 is greater than the bore 8 of the tie rod linkage 2. The threaded position has a smaller diameter and extends through the tie rod linkage and engages nut 11. The length of the cylindrical shank portion 10 thereby dictates the relative position of the tie rod linkage 2 and the steering knuckle arm 1. This arrangement provides a precise connection between the tie rod linkage 2 and the steering arm 1. Furthermore, elimination of the boot seal allows a tighter connection between the tie rod linkage and steering knuckle arm 1 while reducing bearing wear, assembly time and overall reducing the costs of the joint.

Figure 2:
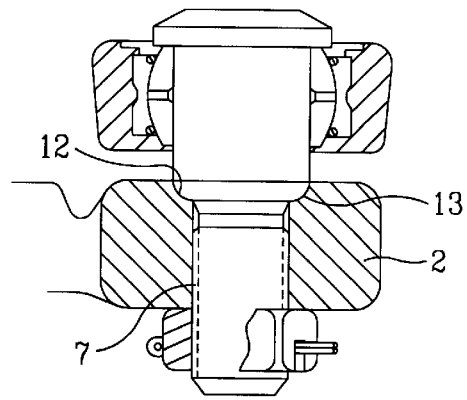
FIG. 2 is a partial cross sectional side view of the connecting joint of FIG. 1 having an alternate seat between the mounting stud and tie rod linkage.

In the embodiment shown in FIG. 2, the cylindrical shank portion 10 is connected to the threaded portion 7 by a shoulder portion 12 which has a rounded contour. The tie rod linkage 2 has a recess 13 corresponding to the shoulder portion 12. When the connection is in place, the shoulder portion 12 sits in the recess 13. Here again, the relative position of the steering knuckle arm 1 and tie rod linkage 2 may be precisely established as well as providing a tight and secure fit between the mounting stud and tie rod linkage.

Figure 3:
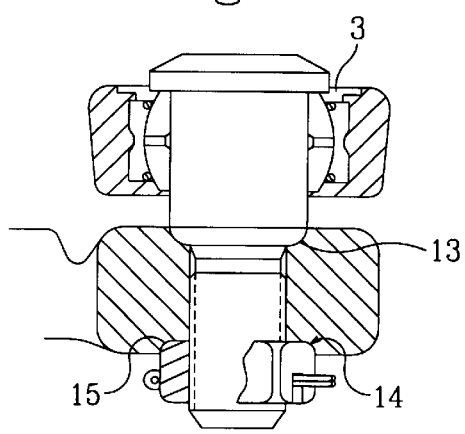
FIG. 3 is a partial cross sectional side view of the connecting joint of FIG. 1 having an alternate seat between the mounting stud and tie rod linkage.

FIG. 3 is substantially similar to that of FIG. 2. FIG. 3 additionally has a recess 14 formed in the tie rod linkage 2 on the opposite side of recess 13. The nut 11 has a shoulder portion 15 which, fits snugly in the recess 14.

Figure 4:
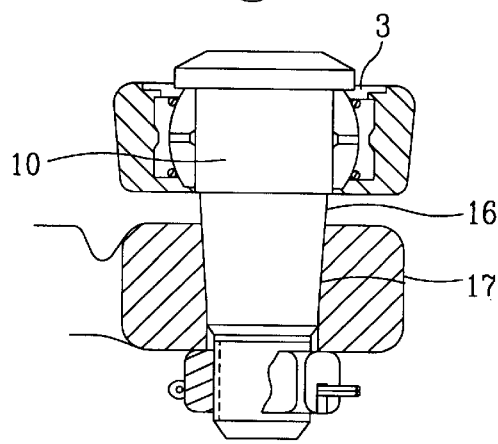
FIG. 4 is a partial cross sectional side view of the connecting joint of FIG. 1 having an alternate seat between the mounting stud and tie rod linkage.

In the embodiment of FIG. 4, the cylindrical shank portion 10 extends just beyond the spherical bearing 3. The mounting stud 6 is then tapered 16 toward threaded portion 7. The tie rod linkage 2 has a tapered recess 17 corresponding to the tapered portion 16 of the mounting stud 6.

Figure 5:
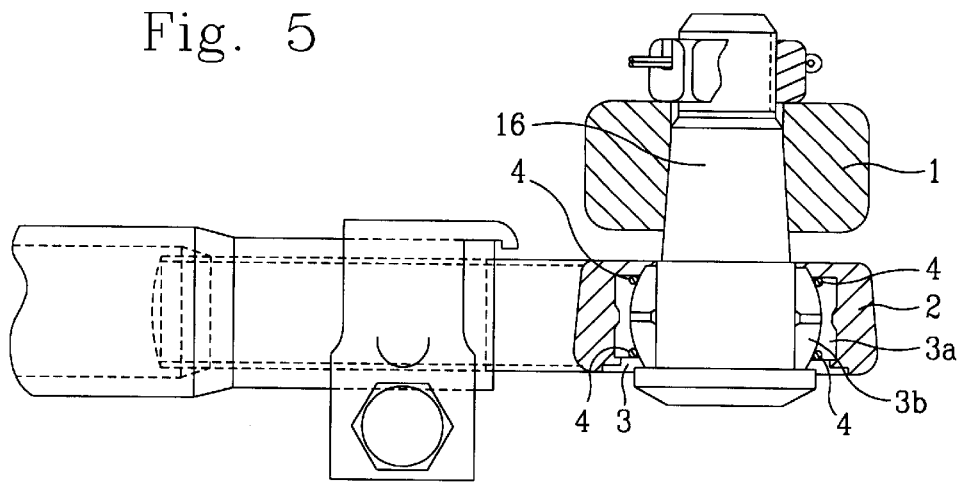
FIG. 5 is partial cross sectional side view of a connecting joint between a tie rod linkage and steering knuckle arm with a spherical bearing and integral seal mounted within the tie rod linkage.
Figure 6:
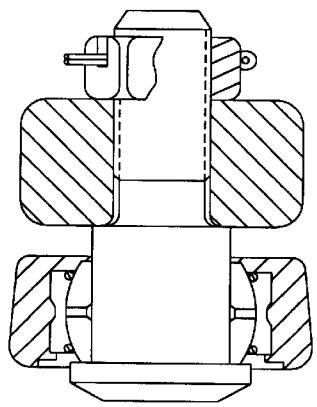
FIG. 6 is a partial cross sectional side view of the connecting joint of FIG. 5 having an alternate seat between the mounting stud and steering knuckle arm.
Figure 7:
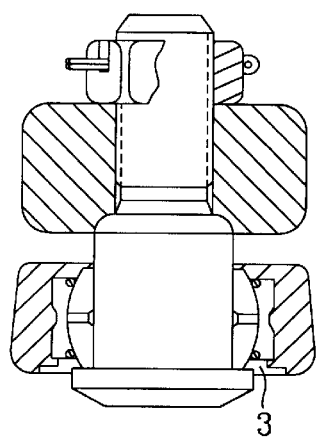
FIG. 7 is a partial cross sectional side view of the connecting joint of FIG. 5 having an alternate seat between the mounting stud and steering knuckle arm.
Figure 8:
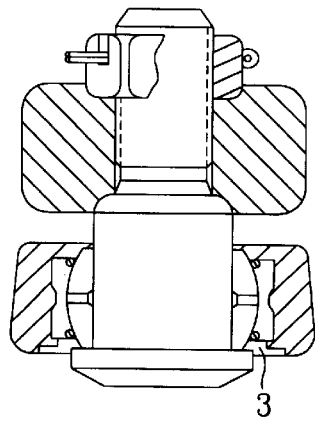
FIG. 8 is a partial cross sectional side view of the connecting joint of FIG. 5 having an alternate seat between the mounting stud and steering knuckle arm.

The embodiments of FIGS. 5–8 are very similar to those of FIGS. 1–4. However, the spherical bearing 3 is disposed within the tie rod linkage. Referring to FIG. 5, spherical bearing, with outer race 3a and seals 4, are disposed within a substantially cylindrical recess formed in the tie rod linkage. Seals 4 are preferably formed as annular rings disposed within an annular notch of the outer race 3a of the spherical bearing. The seals 4, being integral with the outer race of the spherical bearing, eliminate the need for boot seal and decreases assembly time. The spherical bearing is simply formed in the recess of the tie rod linkage and the mounting stud 6 pressed into the spherical bearing. The mounting stud may then be secured to the steering knuckle arm 1. In the embodiment of FIG. 5 the mounting stud has a tapered shank portion 16 engaging a tapered bore 18 of the steering knuckle arm 1. The connection of the mounting stud to the steering knuckle arm 5 of FIG. 5 is similar to the connection of the mounting stud to the tie rod linkage of FIG. 4. Similarly, the connection of the mounting stud to the steering knuckle of FIGS. 6–8 are similar to the connection of the mounting stud to the tie rod linkage of FIGS. 1, 2, 3 respectively.

The spherical bearing includes an inner race, an outer race and a pair of annular seals integrally formed on opposite sides of the outer race. The outer race has an outer peripheral surface which snugly fits within the machined bore of either the steering knuckle arm or tie rod linkage. That is, the bore is specifically machined within tolerances to retain the outer race of the bearing. The outer race has an inner semi-spherical peripheral surface which engages an outer peripheral semi-spherical surface of the inner race. The inner race thereby being allowed to pivot along two degrees of rotation with respect to the outer race. The seals are integrally formed on the outer race adjacent the inner peripheral surface thereof and engages the outer peripheral surface of the inner race. The seals are preferably made of a durable elastomeric material to simultaneously snugly engage the inner race while allowing the inner race to pivot.

While the foregoing invention has been shown and described with reference to a preferred embodiment, it will be understood by those possessing skill in the art that various changes and modifications may be made without departing from the spirit and scope of the invention.

What is claimed is:

1. A connecting joint for a steering assembly comprising:
   a tie rod linkage having a bore extending there through;
   a spherical bearing having;
      an outer race disposed and retained within said bore of said tie rod linkage;
      an inner race disposed within and engaging said outer race and having said second bore extending there through;
      a pair of annular seals disposed between said inner and outer races to prevent ingress of contaminants between said inner and outer races;
   a steering knuckle arm having a machined bore extending there through adapted to receive and retain said spherical bearing; and
   a mounting stud press fitted within and extending through second bore of said spherical bearing, said mounting stud having a shank portion extending to said tie rod linkage and a threaded portion extending through said tie rod linkage and engaging a nut to retain said tie rod linkage thereto.

2. The connection joint according to claim 1 wherein said shank portion of said mounting stud is substantially cylindrical extending to said tie rod linkage and having a diameter larger than said bore of said tie rod linkage, said substantially cylindrical shank portion extending from an end cap portion through said spherical bearing and having a length greater than a width of said spherical bearing to define a space between said steering knuckle arm and said tie rod linkage.

3. The connection according to claim 2, said mounting stud further comprising a shoulder portion connecting said shank portion to said threaded portion, said shoulder portion being disposed in a corresponding first recess formed in said tie rod linkage.

4. The connection according to claim 3, wherein said nut is partially disposed in a second recess formed in said tie rod linkage opposite said first recess.

5. The connection according to claim 1, wherein said shank portion comprises a substantially cylindrical portion extending through said spherical bearing and a tapered portion extending from said substantially cylindrical portion to said threaded portion, said tapered portion being disposed within and engaging a corresponding tapered contour of said bore formed in said tie rod linkage.

6. A connecting joint for a steering assembly comprising:
   a steering knuckle arm having a bore extending there through;
   a spherical bearing having;
      an outer race disposed and retained within said bore of said knuckle arm;
      an inner race disposed within and engaging said outer race and having said second bore extending there through,
      a pair of annular seals disposed between said inner and outer races to prevent ingress of contaminants between said inner and outer races;
   a tie rod linkage having a machined bore extending there through adapted to receive and retain said spherical bearing;
   a mounting stud press fitted within and extending through second bore of said spherical bearing, said mounting stud having a shank portion extending to said steering knuckle arm and a threaded portion extending through said steering knuckle arm and engaging a nut to retain said steering knuckle arm thereto.

7. The connection joint according to claim 6, wherein said shank portion of said mounting stud is substantially cylindrical extending to said steering knuckle arm and having a diameter larger than said bore of said steering knuckle arm, said substantially cylindrical shank portion extending from an end cap portion through said spherical bearing and having a length greater than a width of said spherical bearing to define a space between said tie rod linkage and said steering knuckle arm.

8. The connection according to claim 7, said mounting stud further comprising a shoulder portion connecting said shank portion to said threaded portion, said shoulder portion being disposed in a corresponding first recess formed in said steering knuckle arm.

9. The connection according to claim 8 wherein said nut is partially disposed in a second recess formed in said steering knuckle arm opposite said first recess.

10. The connection according to claim 6, wherein said shank portion comprises a substantially cylindrical portion extending through said spherical bearing and a tapered portion extending from said substantially cylindrical portion to said threaded portion, said tapered portion being disposed within and engaging a corresponding tapered contour of said bore formed in said steering knuckle arm.

11. A combination steering knuckle arm, tie rod linkage and mounting stud, said mounting stud connecting said steering knuckle arm to said tie rod linkage, said combination comprising:

a bore machined in one of said steering knuckle arm and said tie rod linkage;

a spherical bearing disposed and retained within said bore, said spherical bearing having an outer race having an outer peripheral surface substantially mating a machined inner peripheral surface of said bore and a semi-spherical inner peripheral surface, an inner race disposed within and retain by said outer race, said inner race having a semi-spherical outer peripheral surface engaging said inner peripheral surface of said outer race and a second bore extending through said inner race adapted to retain said mounting stud, and a pair of annular seals integrally formed on opposite sides of said outer race each adjacent said semi-spherical inner peripheral surface and engaging said semi-spherical outer peripheral surface of said inner race to prevent ingress of contaminants between said semi-spherical inner peripheral surface of said outer race and said semi-spherical outer peripheral surface of said inner race.

12. The connecting joint according to claim 1, wherein said pair of seals are integrally formed on opposite sides of said outer race and engage an outer bearing surface of said inner race.

13. The connecting joint according to claim 6, wherein said pair of seals are integrally formed on opposite sides of said outer race and engage an outer bearing surface of said inner race.

* * * * *